United States Patent
Takenaga et al.

(10) Patent No.: US 11,491,922 B2
(45) Date of Patent: Nov. 8, 2022

(54) ARRANGEMENT STRUCTURE OF AUXILIARY MACHINE FOR VEHICLE

(71) Applicant: MAZDA MOTOR CORPORATION, Hiroshima (JP)

(72) Inventors: Yohsuke Takenaga, Hatsukaichi (JP); Takeshi Fukunaga, Kure (JP); Hisakazu Konishi, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 650 days.

(21) Appl. No.: 16/486,978

(22) PCT Filed: Feb. 6, 2018

(86) PCT No.: PCT/JP2018/003889
§ 371 (c)(1),
(2) Date: Aug. 19, 2019

(87) PCT Pub. No.: WO2018/155152
PCT Pub. Date: Aug. 30, 2018

(65) Prior Publication Data
US 2020/0231098 A1  Jul. 23, 2020

(30) Foreign Application Priority Data

Feb. 22, 2017  (JP) .............................. JP2017-030639

(51) Int. Cl.
*B60R 11/02* (2006.01)
*B60R 16/02* (2006.01)
(Continued)

(52) U.S. Cl.
CPC ...... *B60R 11/0264* (2013.01); *B60R 16/0215* (2013.01); *B60R 21/02* (2013.01);
(Continued)

(58) Field of Classification Search
CPC . B60R 11/0264; B60R 16/0215; B60R 21/02; B60R 2011/0007;
(Continued)

(56) References Cited

U.S. PATENT DOCUMENTS 7,864,028 B2 * 1/2011 Sakai .................... G08B 25/10
280/735
8,708,079 B2 * 4/2014 Hashimura ............. B60L 53/14
180/311
(Continued)

FOREIGN PATENT DOCUMENTS

CN     102781731 A  * 11/2012  ......... B60N 2/42709
CN     106891906 B  * 12/2018
(Continued)

OTHER PUBLICATIONS

The extended European search report issued by the European Patent Office dated Nov. 6, 2019, which corresponds to EP18757666.5-1132 and is related to U.S. Appl. No. 16/486,978.
(Continued)

*Primary Examiner* — Pinel E Romain
(74) *Attorney, Agent, or Firm* — Studebaker & Brackett PC

(57) ABSTRACT

A vehicular auxiliary machine is disposed between seats arranged side by side in a vehicular width direction of a vehicle body. A bracket is a member on which the vehicular auxiliary machine is mounted, and which is fixed to the vehicle body. The vehicular auxiliary machine includes a harness connecting portion disposed in such a way as to locate on a side of one of the seats. The bracket includes a base surface and a pair of vertical wall portions. Further, the bracket includes a rib spanning between a harness connect-
(Continued)

ing portion and the base surface, on a harness-side vertical wall portion of the paired vertical wall portions close to the harness connecting portion.

11 Claims, 14 Drawing Sheets

(51) Int. Cl.
  *B60R 21/02* (2006.01)
  *B60R 11/00* (2006.01)
  *B60R 21/00* (2006.01)
(52) U.S. Cl.
  CPC ............... *B60R 2011/0007* (2013.01); *B60R 2021/0006* (2013.01); *B60R 2021/0273* (2013.01)
(58) Field of Classification Search
  CPC .... B60R 2021/0006; B60R 2021/0273; B60R 16/02; B60R 21/00
  USPC .................................................. 296/187.12
  See application file for complete search history.

(56) References Cited

U.S. PATENT DOCUMENTS

| 9,283,838 | B2* | 3/2016 | Ohashi | B60L 58/40 |
| 10,150,440 | B2* | 12/2018 | Baccouche | B60R 21/02 |
| 10,183,564 | B2* | 1/2019 | Okada | B60L 50/66 |
| 11,027,680 | B2* | 6/2021 | Line | B60R 16/03 |
| 2002/0009924 | A1 | 1/2002 | Little et al. | |
| 2002/0137397 | A1 | 9/2002 | Little | |
| 2005/0073137 | A1 | 4/2005 | Ooyabu | |
| 2008/0218321 | A1 | 9/2008 | Sakai et al. | |
| 2011/0023628 | A1 | 2/2011 | Hamabe et al. | |

FOREIGN PATENT DOCUMENTS

| CN | 111319526 A * | 6/2020 | ............... B60N 2/01 |
| JP | 2003-527726 A | 9/2003 | |
| JP | 2005-112083 A | 4/2005 | |
| JP | 2005-238990 A | 9/2005 | |
| JP | 2007-099029 A | 4/2007 | |
| JP | 2008-213714 A | 9/2008 | |
| JP | 2009-234379 A | 10/2009 | |
| JP | 2013-119326 A | 6/2013 | |
| JP | 2017-193296 A | 10/2017 | |
| WO | WO-2010137147 A1 * | 12/2010 | ............... B60K 1/04 |
| WO | 2017/002191 A1 | 1/2017 | |

OTHER PUBLICATIONS

International Search Report issued in PCT/JP2018/003889; dated Apr. 17, 2018.

* cited by examiner

ARRANGEMENT STRUCTURE OF AUXILIARY MACHINE FOR VEHICLE

TECHNICAL FIELD

The present invention relates to an arrangement structure of a vehicular auxiliary machine.

BACKGROUND ART

In recent years, in order to enable early rescue of a passenger when a vehicle accident occurs, a so-called automatic emergency alert system configured such that information for specifying a vehicle and a user, an accident situation, a vehicle location, and the like are transmitted from a vehicle to a police station, a fire station, a medical institution, and the like via a service company, is about to spread.

In order to implement this system, a vehicle-mounted emergency alert device (hereinafter, referred to as a DCM) as exemplified in Patent Literature 1 is mounted in a vehicle, as an auxiliary machine for transmitting information to a rescue organization.

An auxiliary machine including a DCM, which is required to play a certain role, when a vehicle accident occurs, for example, a device for automatically releasing a door lock in order to rescue a passenger is preferably disposed between seats arranged side by side in a vehicular width direction such as a center tunnel as a location within a vehicle body, which is less likely to be affected by an accident.

Patent Literature 2 discloses a side collision detection system including an acceleration sensor for detecting an acceleration, a side-collision airbag device disposed on an outer side with respect to each of left and right front seats in a vehicular width direction, a two-step load transmission portion disposed on a side door, and configured to transmit a side-collision load to the acceleration sensor by two steps, and a controller for controlling activation of the side-collision airbag devices, based on a signal from the acceleration sensor.

The side collision detection system disclosed in Patent Literature 2 also appropriately activates a side-collision airbag device, based on a signal from an acceleration sensor A when a side collision occurs, by disposing a controller between left and right seats in such a way that the controller as an auxiliary machine is not broken, even when an accident occurs in a vehicle.

However, since a controller as an auxiliary machine is disposed between left and right seats, the controller may not play an intended function, when a seat is displaced toward the controller and directly interferes with the controller when a side collision occurs.

A controller is required to control a side-collision airbag device to appropriately activate also when a side collision occurs. However, Patent Literature 2 fails to disclose measures against this problem, and there is room for consideration.

In particular, in an arrangement structure of an auxiliary machine disposed in such a way that a harness connecting portion for connecting a harness extending from a vehicle body to the auxiliary machine in order to supply electric power to the auxiliary machine, or transmit and receive a signal to and from the auxiliary machine is located on a side of one of left and right seats, it is necessary to provide measures in such a way that a seat does not directly interfere with the harness connecting portion and damages the harness connecting portion when a side collision occurs.

CITATION LIST

Patent Literature

Patent Literature 1: Japanese Unexamined Patent Application Publication No. 2008-213714
Patent Literature 2: Japanese Unexamined Patent Application Publication No. 2009-234379

SUMMARY OF INVENTION

In view of the above, an object of the present disclosure is to provide an arrangement structure of a vehicular auxiliary machine, which enables to reduce a possibility that the auxiliary machine directly interferes with a seat when a side collision occurs.

An arrangement structure of a vehicle auxiliary machine according to an aspect of the present disclosure includes: the vehicular auxiliary machine disposed between seats arranged side by side in a vehicular width direction of a vehicle body: a bracket on which the vehicular auxiliary machine is mounted, and which is fixed to the vehicle body: and a harness to be connected to the vehicular auxiliary machine. The vehicular auxiliary machine includes a harness connecting portion to which the harness is connected, and is disposed in such a way that the harness connecting portion is located on a side of one of the seats. The bracket includes a base surface, a pair of vertical wall portions which stand upright with respect to the base surface in such a way that the vertical wall portions are away from each other in the vehicular width direction between the vehicular auxiliary machine and each of the seats, and a rib spanning between a harness-side vertical wall portion and the base surface, the harness-side vertical wall portion being one of the paired vertical wall portions close to the harness connecting portion of the vehicular auxiliary machine.

DESCRIPTION OF EMBODIMENTS

In the following, an embodiment is described with reference to the drawings.

Figure 1:
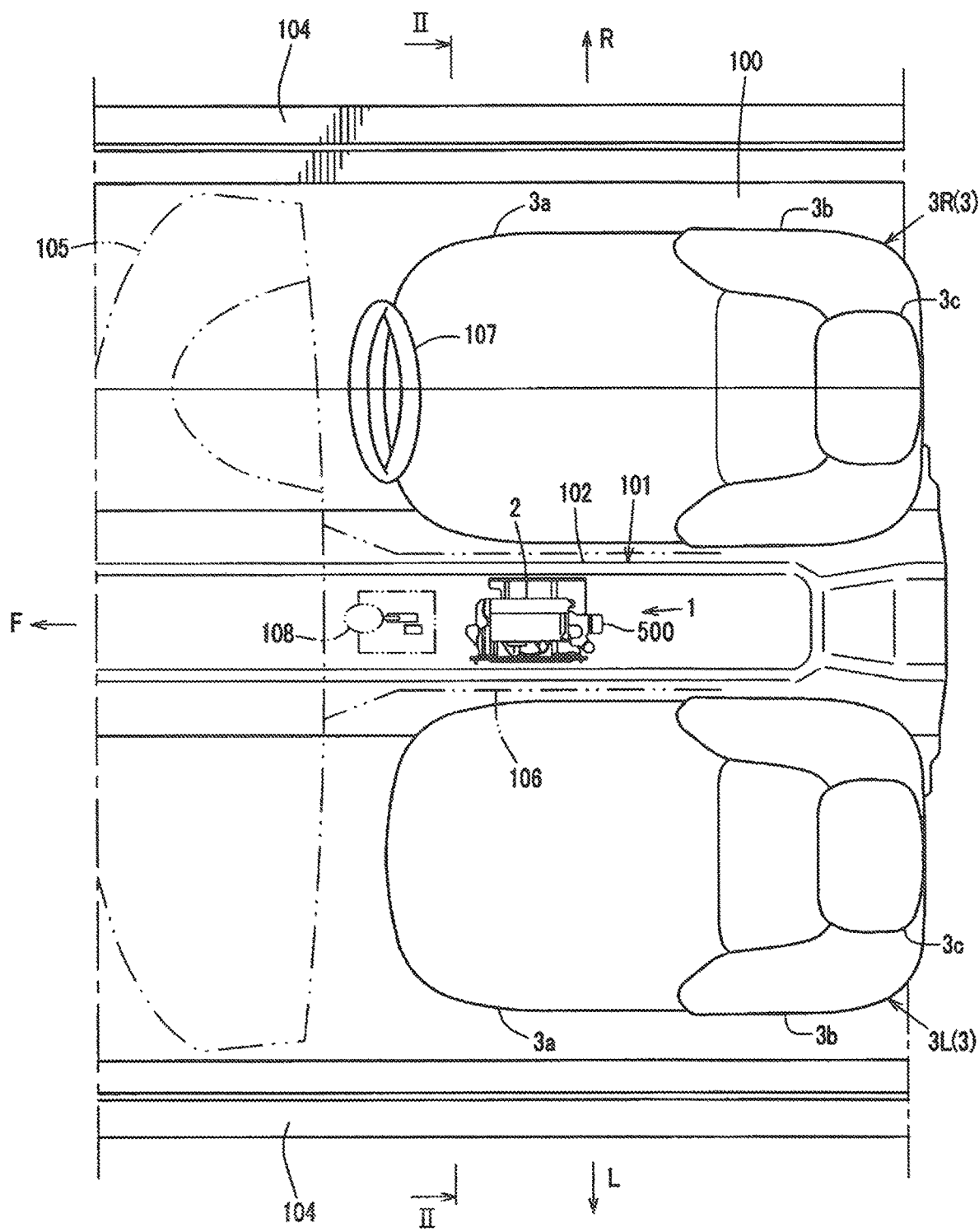
FIG. 1 is a plan view illustrating a part of a vehicle provided with an arrangement structure of a vehicular auxiliary machine according to the present embodiment.
Figure 2:
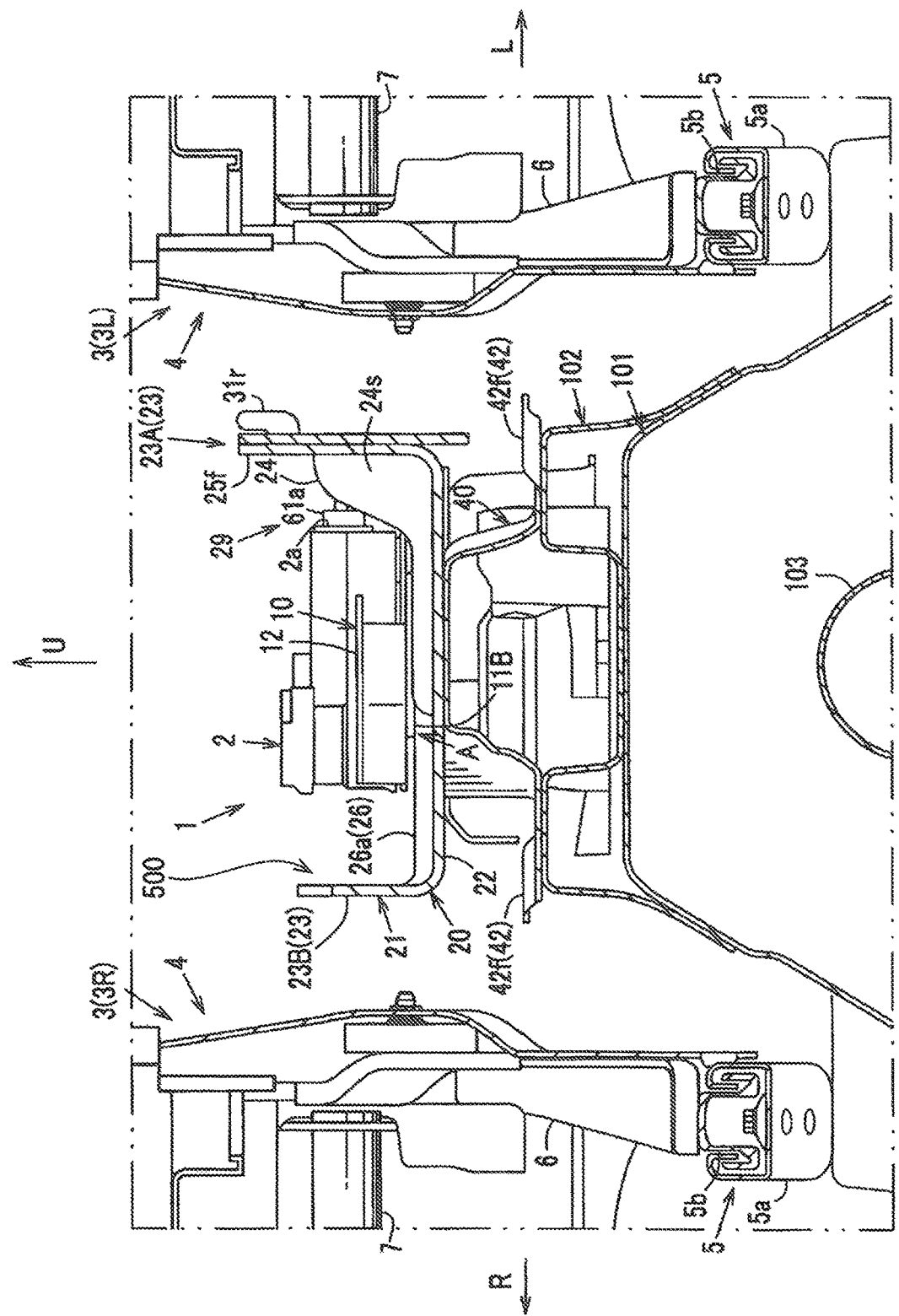
FIG. 2 is a diagram illustrating a II-II section of FIG. 1, and is an enlarged sectional view enlargedly illustrating a part of the vehicle.
Figure 3:
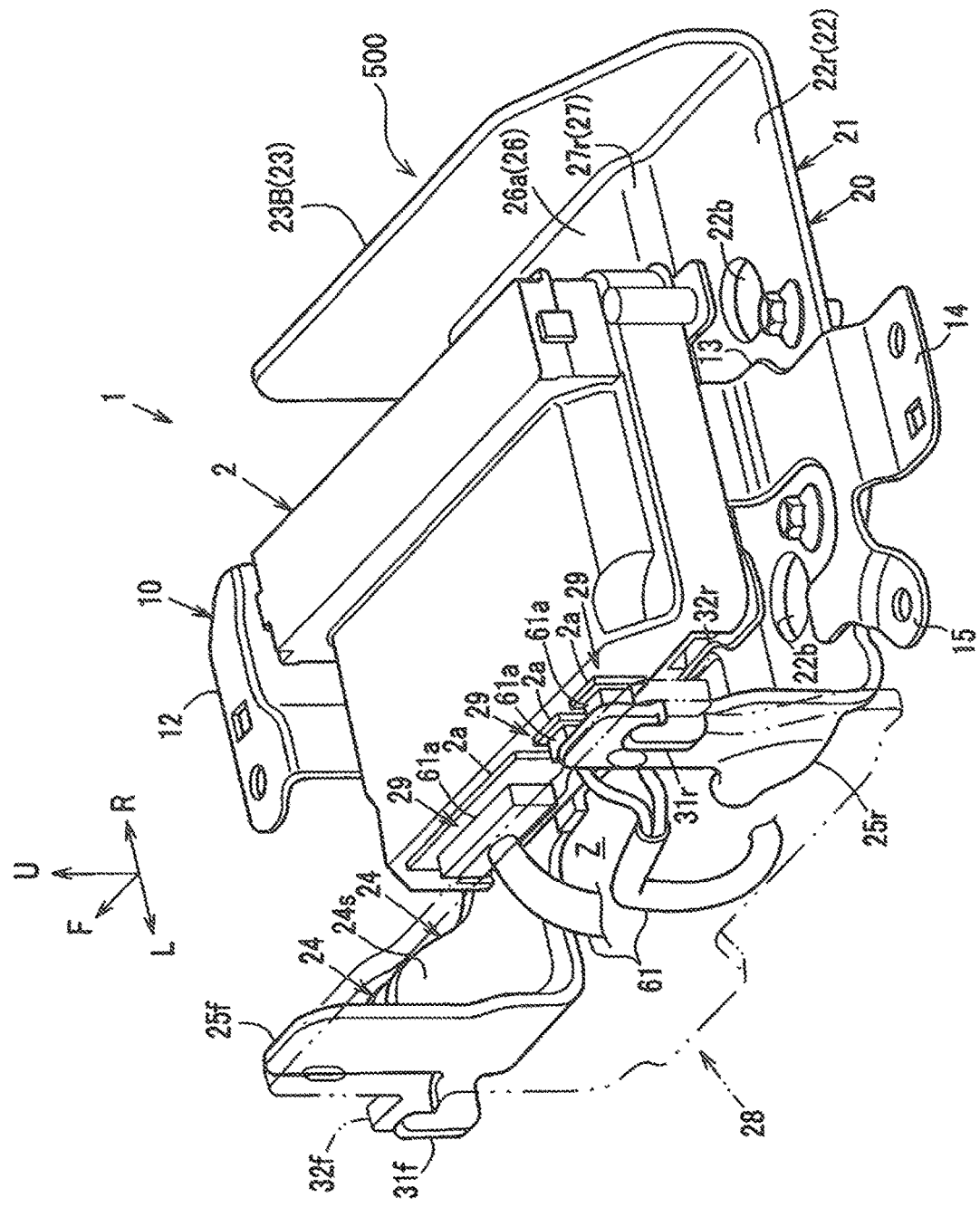
FIG. 3 is a perspective view of the vehicular auxiliary machine and the arrangement structure, when viewed from a rear side and obliquely leftwardly from above.
Figure 4:
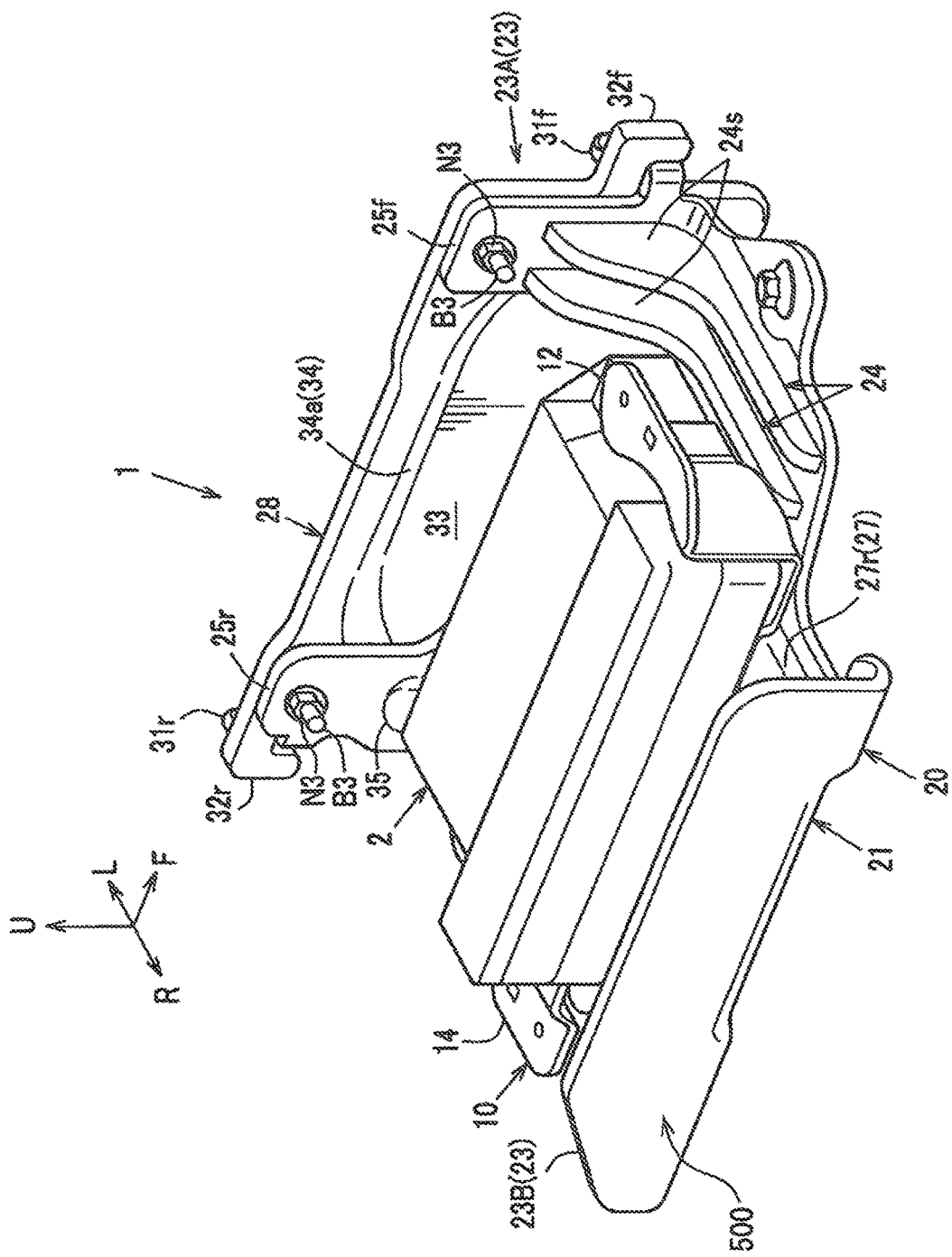
FIG. 4 is a perspective view of the vehicular auxiliary machine and the arrangement structure, when viewed from a front side and obliquely rightwardly from above.
Figure 5:
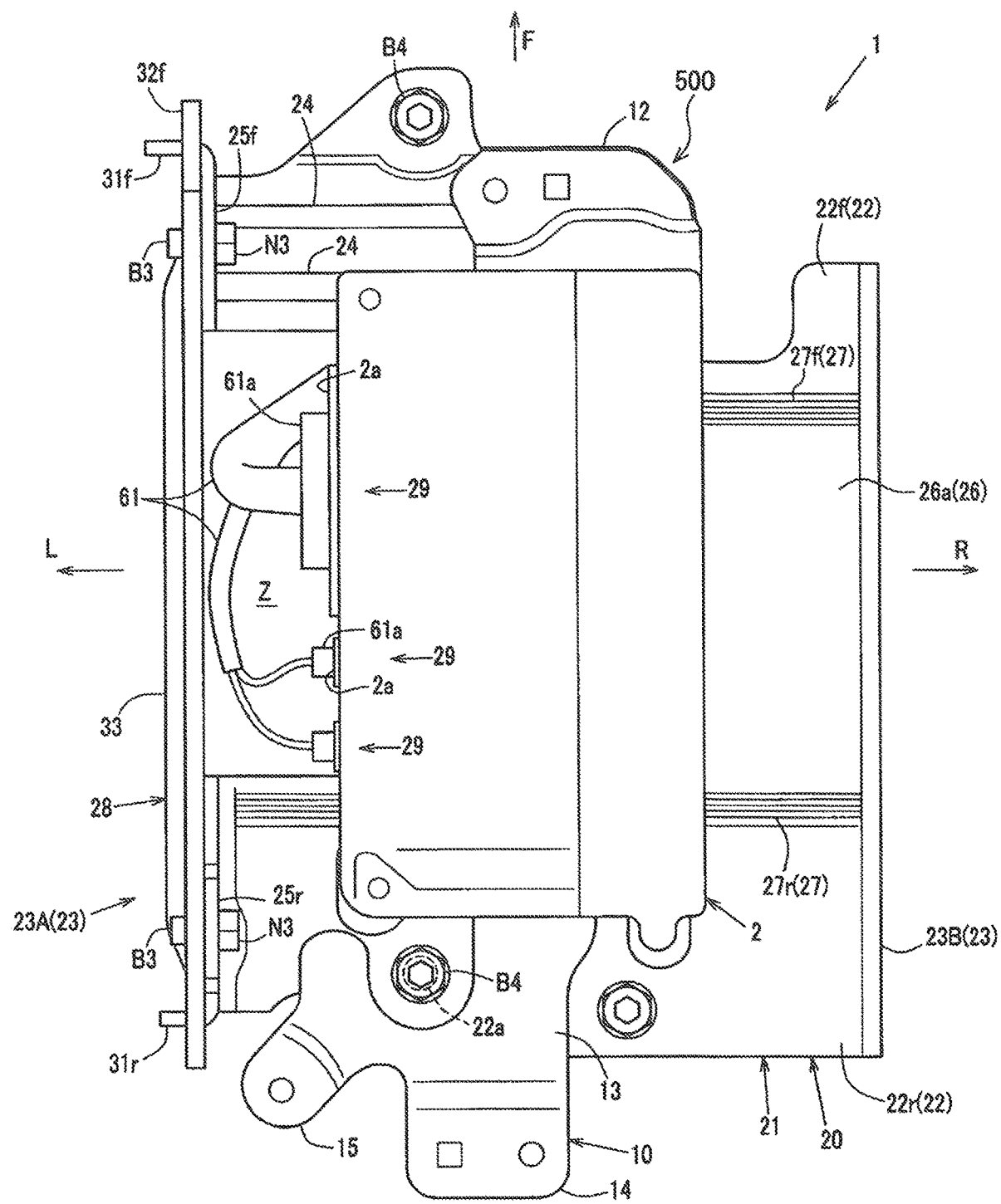
FIG. 5 is a plan view of the vehicular auxiliary machine and the arrangement structure.
Figure 6:
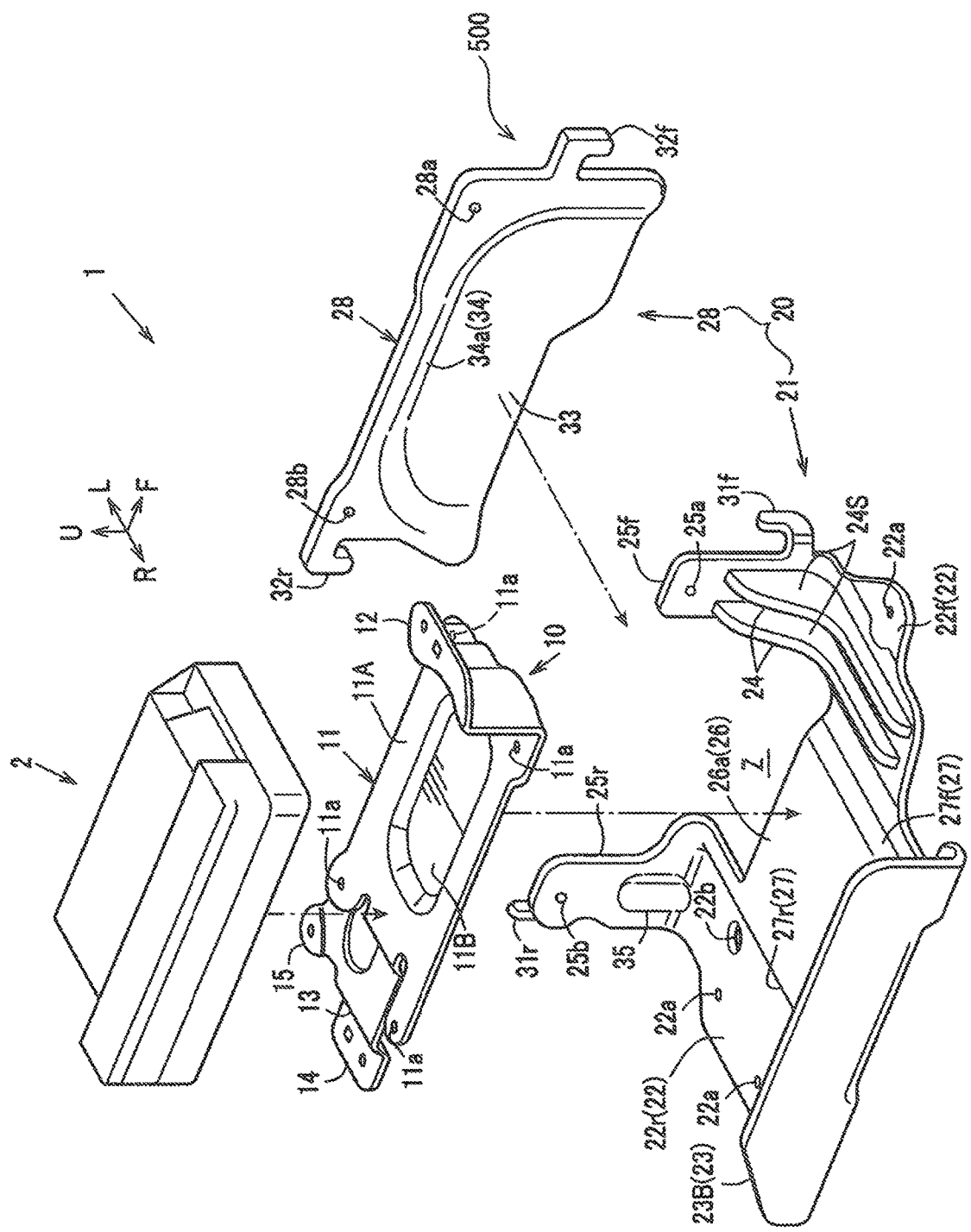
FIG. 6 is an exploded perspective view of the vehicular auxiliary machine and the arrangement structure.
Figure 7:
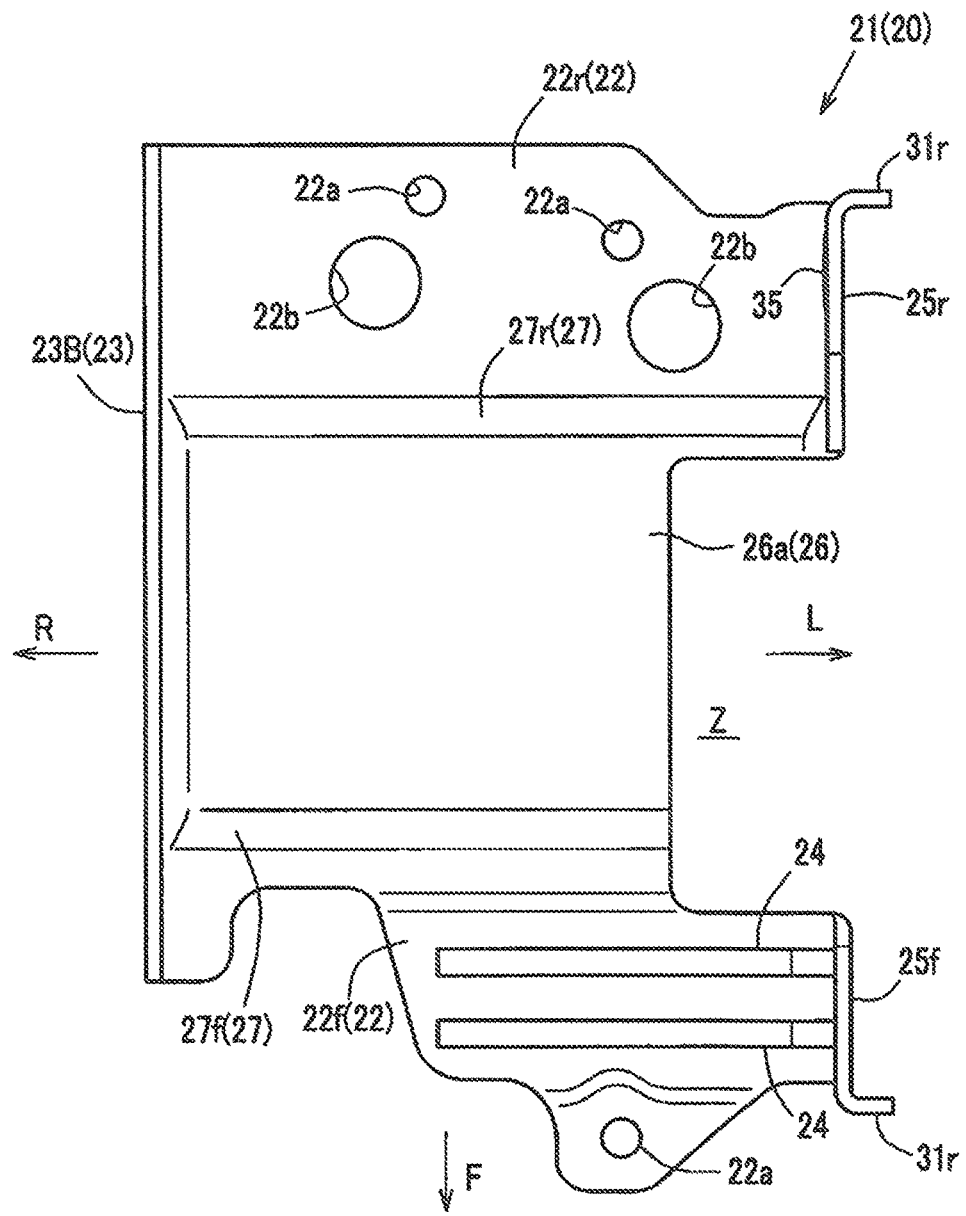
FIG. 7 is a plan view of a protection bracket.
Figure 8:
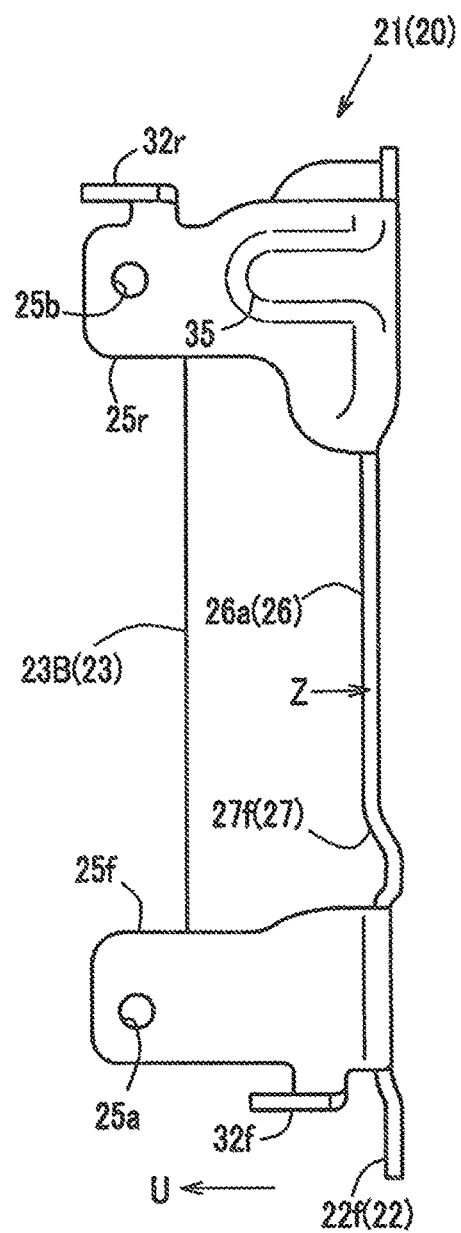
FIG. 8 is a left side view of the protection bracket.
Figure 9:
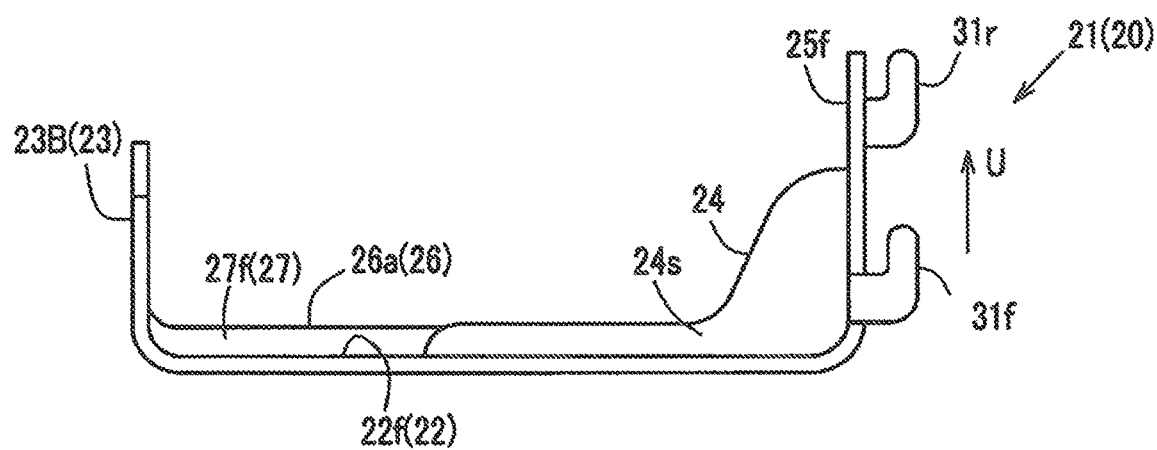
FIG. 9 is a front view of the protection bracket.
Figure 10:
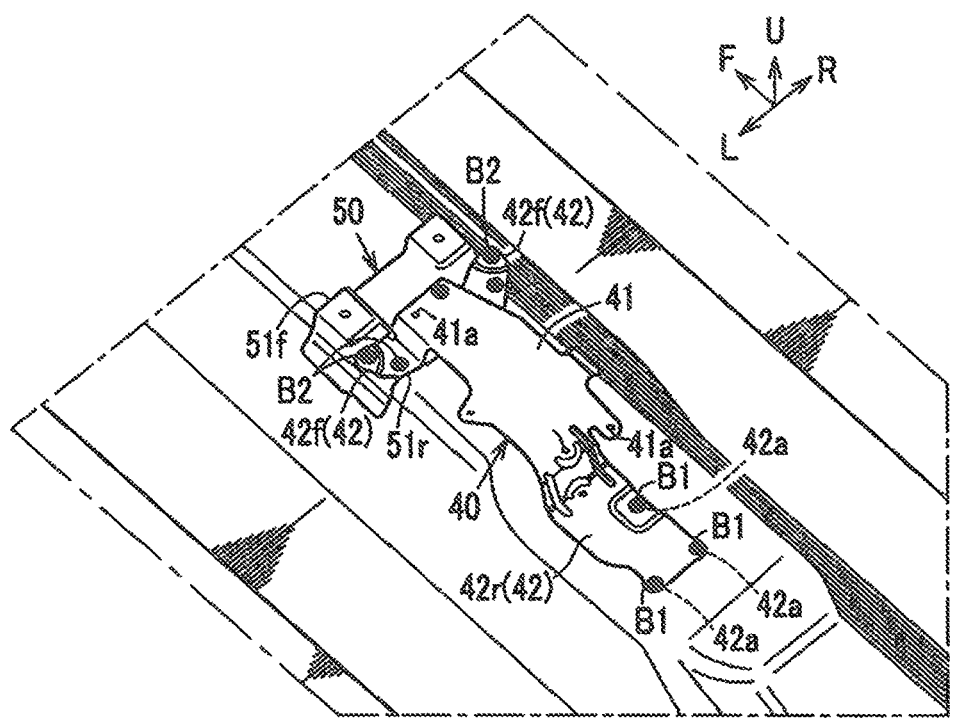
FIG. 10 is a perspective view illustrating a part of a configuration, on a vehicle body side, of a periphery of the arrangement structure of the vehicular auxiliary machine.
Figure 11:
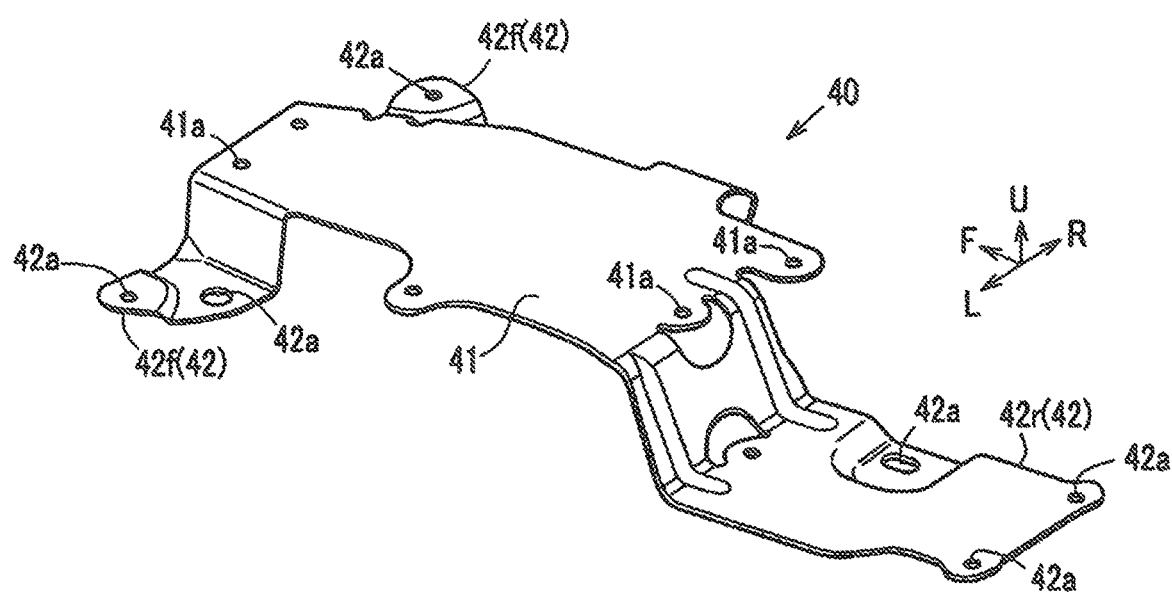
FIG. 11 is an external view of a vehicle-body-side DCM bracket pedestal member for mounting and supporting the arrangement structure of the vehicular auxiliary machine.

FIG. 1 is a plan view illustrating a front portion of a passenger compartment of a vehicle in which a vehicular auxiliary machine of the present embodiment and an arrangement structure thereof are mounted. FIG. 2 is an enlarged sectional view illustrating a II-II section of FIG. 1. FIG. 3 is a perspective view of the vehicular auxiliary machine and the arrangement structure, when viewed from a rear side and obliquely leftwardly from above. FIG. 4 is a perspective view of the vehicular auxiliary machine and the arrangement structure, when viewed from a front side and obliquely rightwardly from above. FIG. 5 is a plan view of the vehicular auxiliary machine and the arrangement structure. FIG. 6 is an exploded perspective view of the vehicular auxiliary machine and the arrangement structure of the vehicular auxiliary machine. FIG. 7 is a plan view of a protection bracket. FIG. 8 is a left side view of the protection bracket. FIG. 9 is a front view of the protection bracket, when viewed from a front side. FIG. 10 is a perspective view illustrating an essential part of a configuration, on a vehicle body side, of a periphery of the arrangement structure of the vehicular auxiliary machine of the present embodiment. FIG. 11 is an external view of a vehicle-body-side DCM bracket pedestal member for mounting and supporting the arrangement structure of the vehicular auxiliary machine.

Further, in the drawings, it is assumed that the arrow F indicates a vehicle front side, the arrow W indicates a vehicular width direction, the arrow R indicates a vehicle right side, the arrow L indicates a vehicle left side, and the arrow U indicates a vehicle upper side.

As illustrated in FIG. 1, a lower surface of a passenger compartment is constituted by a floor panel 100 extending substantially horizontally in a front-rear direction between an unillustrated dashboard lower panel and an unillustrated rear kickup portion. As illustrated in FIGS. 1 and 2, a tunnel portion 101 projecting upwardly (inwardly of a passenger compartment) and extending in a vehicular front-rear direction is formed at a middle portion of the floor panel 100 in the vehicular width direction. A tunnel member 102, which defines a closed section between itself and the tunnel portion 101, is joined to an upper portion of the tunnel portion 101. The tunnel member 102 is a vehicle body rigid member extending in the vehicular front-rear direction along the upper portion of the tunnel portion 101. As illustrated in FIG. 2, an exhaust pipe 103 as one of members of an exhaust system of an engine is disposed inside a lower space of the tunnel portion 101 on a vehicle outer side.

Further, as illustrated in FIG. 1, a side sill 104 as a vehicle body rigid member extending in the vehicular front-rear direction is joined to both ends of the floor panel 100 in the vehicular width direction.

Further, front seats 3 are arranged side by side in the vehicular width direction on a front portion of the front panel 100. The front seats 3 comprise a driver's seat 3R disposed on a right side with respect to the tunnel portion 101, and a passenger's seat 3L disposed on a left side with respect to the tunnel portion 101 in a right-hand drive vehicle.

The driver's seat 3R and the passenger's seat 3L are constituted by right and left separate seats, each of which includes a seat cushion 3a, a seatback 3b, and a headrest 3c.

Since the driver's seat 3R and the passenger's seat 3L have substantially a same configuration, description is made based on a configuration of one of the front seats 3, and description on the other front seat 3 is omitted.

As illustrated in FIG. 2, a seat support structure 4 for supporting the seat cushion 3a, the seatback 3b, and the headrest 3c is provided on a lower portion of the front seat 3. The seat support structure 4 includes a slide mechanism 5 extending in the vehicular front-rear direction between itself and the front panel 100, and configured to support the seat cushion 3a in a seat front-rear direction (vehicular front-rear direction). The slide mechanism 5 is provided by a pair (left and right) in the vehicular width direction of the front seat 3 (in FIG. 2, only one slide mechanism 5 is illustrated). The slide mechanism 5 is mainly constituted by a pair of left and right seat rails 5a fixed to the front panel 100, and a slider 5b slidably engaged with the seat rails 5a.

Further, the seat support mechanism 4 includes a support bracket 6, on each of left and right sides thereof, which is interposed between the slider 5b of the slide mechanism 5 and the seat cushion 3a, and configured to support the seat cushion 3a.

In the seat support mechanism 4, a bar-shaped (pipe-shaped) seat cushion frame 7 extending linearly in the vehicular width direction spans between the left and right support brackets 6. Both ends of the seat cushion frame 7 in the vehicular width direction are fixed to the respective associated support brackets 6 by welding or the like.

The seat cushion frame 7 may have a function as a stabilizer for transmitting driving of a driving unit (not illustrated) provided on one of left and right sides to the other of the left and right sides in order to drive a link member and the like included in a lifter mechanism (not illustrated), as necessary, in addition to a function as a reinforcing member for enhancing rigidity of a lower portion of the front seat 3.

Further, as illustrated in FIG. 1, an instrument panel 105 extending in the vehicular width direction is disposed on the front portion within the passenger compartment of the vehicle. A center console 106 projecting from the instrument panel 105 rearwardly of a vehicle body is disposed in such a way as to cover the tunnel member 102 extending in a front-rear direction from a passenger compartment side (from above) between the left and right front seats 3 (the passenger's seat 3L and the driver's seat 3R). Note that a steering wheel 107 is disposed on a front side of the driver's seat 3R.

As illustrated in FIG. 1, a shift knob 108 is provided on the center console 106. The shift knob 108 is mounted and supported by the tunnel member 102 via a shift knob mounting pedestal member 50 to be described later (see FIG. 10). A DCM unit 1 is disposed behind the shift knob 108.

As illustrated in FIG. 2, the DCM unit 1 is constituted by a data communication module (DCM) 2 as a vehicular auxiliary machine of the present embodiment, and a DCM bracket 500. The DCM unit 1 is directly or indirectly mounted and supported by the tunnel member 102 on a vehicle body side, specifically, via a DCM bracket pedestal member 40 in a state that the DCM unit 1 is covered by the center console 106 from a passenger compartment side (from above), between the passenger's seat 3L and the driver's seat 3R arranged side by side in the vehicular width direction.

As illustrated in FIGS. 10 and 11, the DCM bracket pedestal member 40 is integrally formed by a steel plate, specifically, by a pedestal portion 41, and a plurality of tunnel member mounting flanges 42 (42f and 42r) extending outwardly from the pedestal portion 41 in a plan view from below. A mounting hole 42a passes through the rear-side tunnel member mounting flange 42r of the plurality of tunnel member mounting flanges 42, which extends from a rear portion of the pedestal portion 41 downwardly and rearwardly. The rear-side tunnel member mounting flange 42r is fixedly fastened in the mounting hole 42a by using a bolt B1 and a nut (not illustrated).

On the other hand, a mounting hole 42a passes through the front-side tunnel member mounting flange 42f of the plurality of tunnel member mounting flanges 42, which extends from a front portion of the pedestal portion 41 downwardly and toward left and right sides. The front-side tunnel member mounting flange 42f is fixedly fastened to the shift knob mounting pedestal member 50 in the mounting hole 42a by using, a bolt 132 and a nut (not illustrated). Specifically, as illustrated in FIG. 10, whereas the rear-side tunnel member mounting flange 42r is directly fixedly fastened to the tunnel member 102, the front-side tunnel member mounting flange 42f is fixedly fastened to the tunnel member 102 via the shift knob mounting pedestal member 50.

As illustrated in FIG. 10, the shift knob mounting pedestal member 50 is fixedly fastened to an upper surface of the tunnel member 102 by a bolt and a nut in such a way that a front portion of the shift knob mounting pedestal member 50 is located on a front side with respect to the DCM bracket pedestal member 40. Further, the front-side tunnel member mounting flange 42f is mounted on a rear-side pedestal surface 51r, which is formed on a rear portion of the shift knob mounting pedestal member 50, and a front-side pedestal surface 51f on which the shift knob 108 is mounted is formed on a front portion of the shift knob mounting pedestal member 50.

Specifically, the shift knob mounting pedestal member 50 mounts not only the shift knob 108 but also a front portion of the DCM bracket pedestal member 40.

More strictly speaking, front and rear portions of the shift knob 108 are supported from front and rear sides by two bracket members. One of the brackets for supporting a rear portion of the shift knob 108 corresponds to the shift knob mounting pedestal member 50. In the drawings to be used in describing the present embodiment, illustration of a bracket for supporting a front portion of the shift knob 108 is omitted.

The DCM 2 is a vehicle-mounted emergency alert device for transmitting information from a vehicle to a rescue organization. As illustrated in FIGS. 2 to 6, an entirety of the DCM 2 is covered by a housing. The DCM 2 has a three-dimensional shape, namely, a substantially rectangular shape in a plan view, with a long length in the vehicular front-rear direction, as compared with the vehicular width direction.

As illustrated in FIG. 2, the DCM 2 is disposed at such a height as to face the seat cushion frames 7 whose left and right surfaces are included in lower portions of the front seats 3R and 3L on respectively associated sides, particularly, inner end portions of bars of the seat cushions 3a in the vehicular width direction, at an intermediate position of the front right seat 3R and the front left seat 3L arranged side by side in the vehicular width direction, in a state that the DCM 2 is mounted on a vehicle body, namely, is supported by the vehicle-body-side DCM bracket pedestal member 40 via the DCM bracket 500.

As illustrated in FIGS. 2, 3, and 5, a DCM-side connector 2a for connecting a harness-side connector 61a, which is included in one end of a harness 61 extending from the vehicle body for power supply and a signal line, is provided on one of left and right surfaces of the DCM 2, specifically, on a surface (left surface) on a left side (side facing the passenger's seat 3L) in the present embodiment. Further, a harness connecting portion 29 is formed on a connecting, portion between the harness-side connector 61a and the DCM-side connector 2a.

In the present embodiment, the harness connecting portion 29 is formed on one of left and right surfaces of the DCM 2 in such a way that a front-rear length of the DCM 2 whose size in a front-rear direction is longer than a size in a width direction is not further lengthened.

As illustrated in FIGS. 2 to 6, the DCM bracket 500 is mainly constituted by two members, namely, a DCM fixing bracket 10 for fixing the DCM 2, and a protection bracket 20 mounted to the vehicle body.

As illustrated in FIGS. 3 to 6, the protection bracket 20 includes a base surface 22 constituting a bottom surface, left and right vertical wall portions 23 (23A and 23B), which stand upright substantially at a right angle with respect to the base surface 22 from both outer ends of the base surface 22 in the vehicular width direction, and ribs 24 formed to span between the left vertical wall portion 23A and the base surface 22.

The left and right vertical wall portions 23 are spaced away from each other via the base surface 22 in the vehicular width direction.

As illustrated in FIGS. 2, 4, and 5, the vertical wall portion 23A on a vehicle left side, specifically, the vertical wall portion 23A (hereinafter, referred to as the "harness-side vertical wall portion 23A") on a side close to the harness connecting portion 29 stands upright substantially at a right angle with respect to the base surface 22 in such a way as to interpose between the passenger's seat 3L and the DCM 2 in the vehicular width direction. The harness-side vertical wall portion 23A is formed to have a height higher than the right vertical wall portion 23B.

On the other hand, the right vertical wall portion 23B, specifically, the vertical wall portion 23B (hereinafter, referred to as the "non-harness-side vertical wall portion 23B") on a side far from the harness connecting portion 29 in the vehicular width direction (a side opposite to the vertical wall portion 23A with respect to the DCM 2 in the vehicular width direction) stands upright substantially at a right angle with respect to the base surface 22 in such a way as to interpose between the driver's seat 3R and the DCM 2 in the vehicular width direction.

As illustrated in FIG. 6, the protection bracket 20 is mainly constituted by two members, namely, a protection bracket body 21 including the base surface 22 and the non-harness-side vertical wall portion 23B, and a plate-shaped protection plate 28 whose shape is similar to a shape of the harness-side vertical wall portion 23A in a plan view, when viewed from the passenger's seat 3L side.

A front-side upright portion 25f and a rear-side upright portion 25r which stand upright substantially at a right angle with respect to the base surface 22 from front and rear ends of a left end portion of the base surface 22 are formed on the left end portion of the base surface 22 of the protection bracket body 21.

Further, the harness-side vertical wall portion 23A is formed by the front-side upright portion 25f, the rear-side upright portion 25r, and the protection plate 28.

As illustrated in FIGS. 3 to 9, a front-side engagement projecting piece 31f which projects, while bending from an intermediate portion of a front edge of the front-side upright portion 25f in an up-down direction forwardly, leftwardly, and upwardly in this order, is formed on the front-side upright portion 25f. A rear-side engagement projecting piece 31r which projects, while bending from an upper portion of a rear edge of the rear-side upright portion 25r rearwardly, leftwardly, and upwardly in this order, is formed on the rear-side upright portion 25r. Further, a front-side engaged projecting piece 32f which projects, while bending from an intermediate portion of a front edge of the protection plate 28 in an up-down direction forwardly and downwardly in this order, is formed on the protection plate 28. A rear-side engaged projecting piece 32r which projects, while bending from an upper portion of a rear edge of the protection plate 28 rearwardly and downwardly in this order, is formed on the protection plate 28.

Further, the protection bracket 20 allows, on front and rear sides thereof, engagement between the front-side engagement projecting, piece 31f of the front-side upright portion 25f and the front-side engaged projecting piece 32f of the protection plate 28, and engagement between the rear-side engagement projecting piece 31r of the rear-side upright portion 25r and the rear-side engaged projecting piece 32r of the protection plate 28. Thus, in the present embodiment, it is possible to temporarily fix the protection plate 28 to the protection bracket body 21, in other words, detachably mount the protection plate 28 to the protection bracket body 21.

Further, as illustrated in FIGS. 6 and 8, the protection bracket body 21 is configured such that body-side mounting holes 25a and 25b respectively pass through upper portions of the front-side upright portion 25f and the rear-side upright portion 25r in a plate thickness direction (vehicular width direction). Furthermore, as illustrated in FIG. 6, the protection plate 28 is configured such that protection-plate-side mounting holes 28a and 28b pass through the protection plate 28 in a plate thickness direction in upper front and rear portions of the protection plate 28, specifically, in portions of the protection plate 28 facing the body-side mounting holes 25a and 25b, when the protection plate 28 is engaged with the protection bracket body 21.

Further, it is possible to fixedly fasten the protection bracket body 21 and the protection plate 28 on front and rear sides thereof via the body-side mounting holes 25a and 25b and the protection-plate-side mounting holes 28a and 28b by using bolts B3 and nuts N3 (see FIGS. 4 and 5).

Specifically, the DCM unit 1 of the present embodiment is mounted to the vehicle body after the DCM 2, the DCM fixing bracket 10, and the protection bracket 20 are integrally incorporated (assembled). When assembling, the DCM unit 1 is mounted to the vehicle body in a state that the protection plate 28 is not mounted. After the harness-side connector 61a is connected to the DCM-side connector 2a, as described above, the protection plate 28 is temporarily fixed to the protection bracket body 21, and thereafter, is mounted to the protection bracket body 21 by using the bolts B3 and the nuts N3.

Thus, in the present embodiment, it possible to form the harness-side vertical wall portion 23A on a left surface of the DCM unit 1. As illustrated in FIG. 2, it is possible to dispose the harness-side vertical wall portion 23A between the passenger's seat 3L and the DCM 2 in the vehicular width direction.

As illustrated in FIGS. 4 and 6, a bulging portion 33, whose portion from a middle portion in a front-rear direction toward a lower end portion bulges toward one side in a plate thickness direction (in this example, toward a left side) with respect to an outer periphery of the portion, is formed on a surface of the protection bracket 20. A bead 34 which defines a ridge of the bulging portion 33 is formed on a perimeter of the bulging portion 33 except for a lower end thereof. The bead 34 includes a front-rear-direction bead 34a extending along the vehicular front-rear direction.

The front-rear-direction bead 34a is a reinforcing member for increasing strength of the protection bracket 20, when a part of the seat cushion 3a of the passenger's seat 3L is abutted against the protection bracket 20 when a side collision occurs.

As illustrated in FIGS. 4 to 9, the ribs 24 are formed side by side away from each other by a certain clearance in the vehicular front-rear direction. The ribs 24 (the front rib 24 and the rear rib 24) are formed to span between the front-side upright portion 25f and the base surface 22 at a corner portion (inner corner portion) of the front-side upright portion 25f and the base surface 22. The ribs 24 have a same shape, and, each of the ribs 24 includes a surface 24s parallel to the vehicular width direction and an up-down direction, specifically, the surface 24s orthogonal to a front-rear direction.

Specifically, the rib 24 projects upwardly with respect to an upper surface of a front portion 22f of the base surface 22 (base surface front portion 22f) over the entire length of the front portion 22f in the vehicular width direction, and is formed to have a substantially inverted L-shape in a rear view, when viewed from a vehicle front side, while projecting rightwardly of the vehicle with respect to a right surface (inner surface in the vehicular width direction) of the front-side upright portion 25f at a position immediately before a position where a left portion of the vehicle reaches the body-side mounting hole 25a of the front-side upright portion 25f (see FIG. 2).

Note that a bead 35 extending in an up-down direction including a corner portion with respect to the base surface 22 is formed on the rear-side upright portion 25r (see FIGS. 4 and 6).

Further, as illustrated in FIGS. 6 and 7 to 9, a pedestal portion 26 bulging with respect to an upper surface of each of front and rear portions of the base surface 22 (the base-surface front portion 22f and a base-surface rear portion 22r) is formed at an intermediate portion of the base surface 22 of the protection bracket body 21 in a front-rear direction. A flat-shaped pedestal surface 26a capable of placing the DCM fixing bracket 10 is formed on an upper surface of the pedestal portion 26.

As illustrated in FIGS. 6 and 7, a harness mounting space Z capable of mounting the harness 61 extending from the harness connecting portion 29 (harness-side connector 61a) downwardly is formed into a cutout shape in a left portion of the pedestal portion 41, and in an inner portion of the pedestal portion 41 with respect to the front-side upright portion 25f and the rear-side upright portion 25r in the vehicular width direction.

A step portion 27 bulging stepwise with respect to a front portion of the base surface 22 is formed on each of a front edge and a rear edge of the pedestal portion 41. The step portions 27 (a front-side step portion 27f and a rear-side step portion 27r) each extends linearly in the vehicular width direction. The rear-side step portion 27r extends in the vehicular width direction in such a way as to connect the non-harness-side vertical wall portion 23B and the harness-side vertical wall portion 23A (rear-side upright portion 25r).

Further, as illustrated in FIGS. 6 and 7, a mounting hole 22a passes through two portions of a rear portion of the base-surface rear portion 22r away from each other in the vehicular width direction, and a portion of the base-surface front portion 22f at a position on a front side with respect to the ribs 24, namely, three portions in total, specifically, portions associated with mounting holes 41a formed in the pedestal portion 41 of the DCM bracket pedestal member 40 illustrated in FIGS. 10 and 11.

Further, the protection bracket 20 is mounted to the vehicle-side DCM bracket pedestal member 40 by fixedly fastening via the mounting holes 41a and the mounting holes 22a by using bolts B4 (see FIG. 5) and nuts (unillustrated) in a state that the DCM fixing bracket 10 is placed on the pedestal portion 41 of the DCM bracket pedestal member 40.

As illustrated in FIG. 6, the DCM fixing bracket 10 is integrally formed by a DCM mounting pedestal portion 11A for mounting the DCM 2 on an outer periphery of the DCM fixing bracket body portion 11 having a substantially rectangular shape in a plan view; a setting portion 11B for setting the DCM fixing bracket 10 on the pedestal surface 26a of the protection bracket 20; a front-side grounding flange portion 12 for fixedly connecting an unillustrated grounding terminal, which is disposed on a front side of the DCM 2, a rear extension portion 13 extending rearwardly with respect to the DCM fixing bracket body portion 11; a rear-side grounding flange portion 14 for fixedly connecting an unillustrated grounding terminal, which is disposed on a rear side of the DCM 2; and a clip-mounting flange portion 15 for fixing a harness (not illustrated) to be connected to an unillustrated vehicular auxiliary machine other than the DCM 2.

The DCM mounting pedestal portion 11A is formed into a flat shape. A mounting hole 11a for fixedly fastening the DCM 2 by using a bolt and a nut at four corner portions of the DCM mounting pedestal portion 11A is formed in the DCM mounting pedestal portion 11A.

As illustrated in FIG. 7, through-holes 22b formed in the base-surface rear portion 22r of the protection bracket 22 in association with the mounting holes 11a in a plan view are service holes for insertion of bolts (unillustrated), which are used in mounting the DCM 2 to the DCM mounting pedestal portion 11A.

As illustrated in FIG. 6, the setting portion 11B is formed into a downward recess with respect to the DCM mounting pedestal portion 11A at a middle portion of the DCM fixing bracket body portion 11. A lower surface (bottom surface) of the setting portion 11B is formed into a flat shape in such a way that the setting portion 11B is able to come into surface contact with the pedestal surface 26a of the protection bracket 20.

The from-side grounding flange portion 12 stands upright at a right angle with respect to the DCM mounting pedestal portion 11A from a front end of the DCM fixing bracket body portion 11, and extends horizontally and rearwardly from an upper end of the DCM fixing bracket body portion 11.

The rear extension portion 13 is disposed above the base-surface rear portion 22r of the protection bracket 20. Further, as illustrated in FIG. 5, the rear extension portion 13 extends horizontally and rearwardly from a rear end of the DCM fixing bracket body portion 11 in such a way as to detour the mounting holes 22a (see FIG. 7) in a plan view.

As illustrated in FIG. 5, the rear-side grounding flange portion 14 and the clip-mounting flange portion 15 respectively extend horizontally rearwardly, and obliquely leftwardly and rearwardly from the rear extension portion 13.

The DCM fixing bracket 10 is fixed only via the protection bracket 10 with respect to the vehicle body, specifically, the DCM bracket pedestal member 40 (see FIGS. 10 and 11) in such a way that a side collision load is not directly transmitted from the vehicle body when a side collision occurs. Thus, the DCM fixing bracket 10 is displaceable relative to the protection bracket 20, when the protection bracket 20 is deformed (see FIG. 2).

Specifically, a lower surface of the setting portion 11B of the DCM fixing bracket 10 comes into surface contact with the pedestal surface 26a of the protection bracket 20, and is welded to the pedestal surface 26a at the contact portion.

On the other hand, the DCM fixing bracket 10 and the protection bracket 20 are fixed only by welding the lower surface of the setting portion 11B and the pedestal surface 26a. The DCM fixing bracket 10 is fixed neither to the DCM fixing bracket 10 except for the welded portion A, nor to the vehicle body.

Thus, the DCM fixing bracket 10 is displaceable relative to the protection bracket 20, when the lower surface of the setting portion 11B is detached from the pedestal surface 26a of the protection bracket 20 when a side collision occurs.

Figure 12:
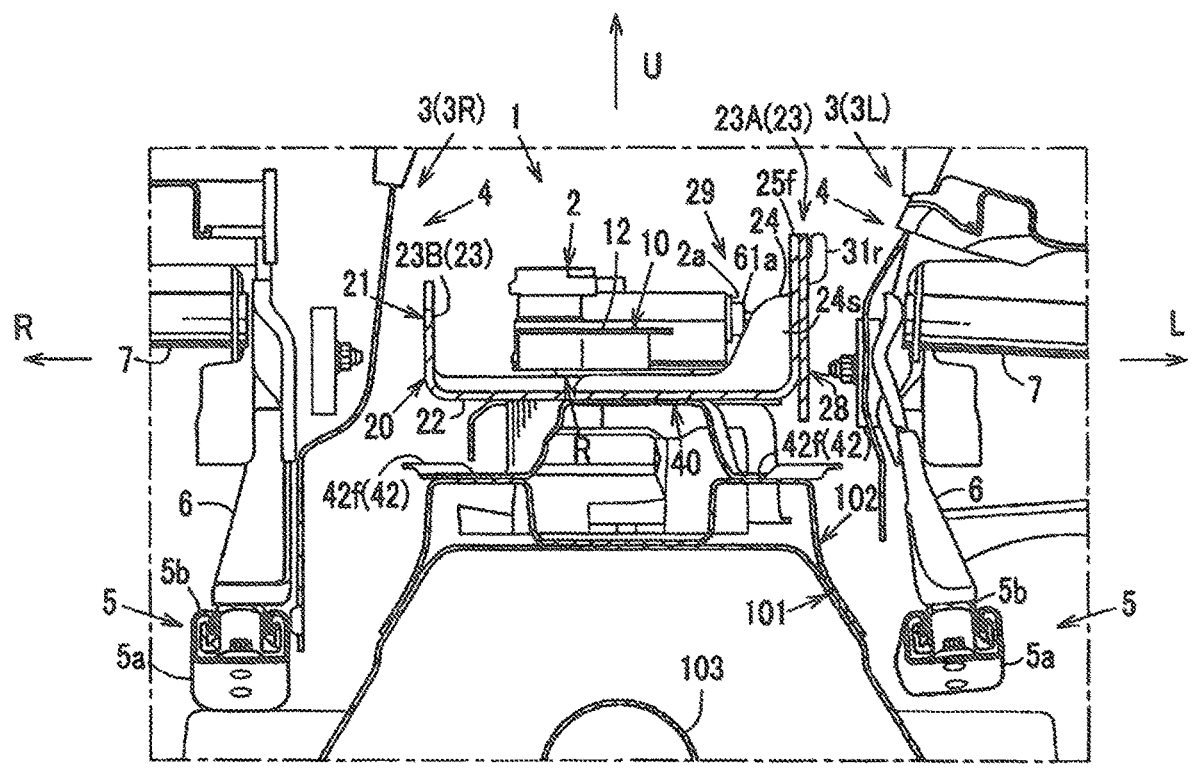
FIG. 12 is an operation explanatory diagram illustrating the arrangement structure of the vehicular auxiliary machine in an initial stage of side collision.
Figure 13:
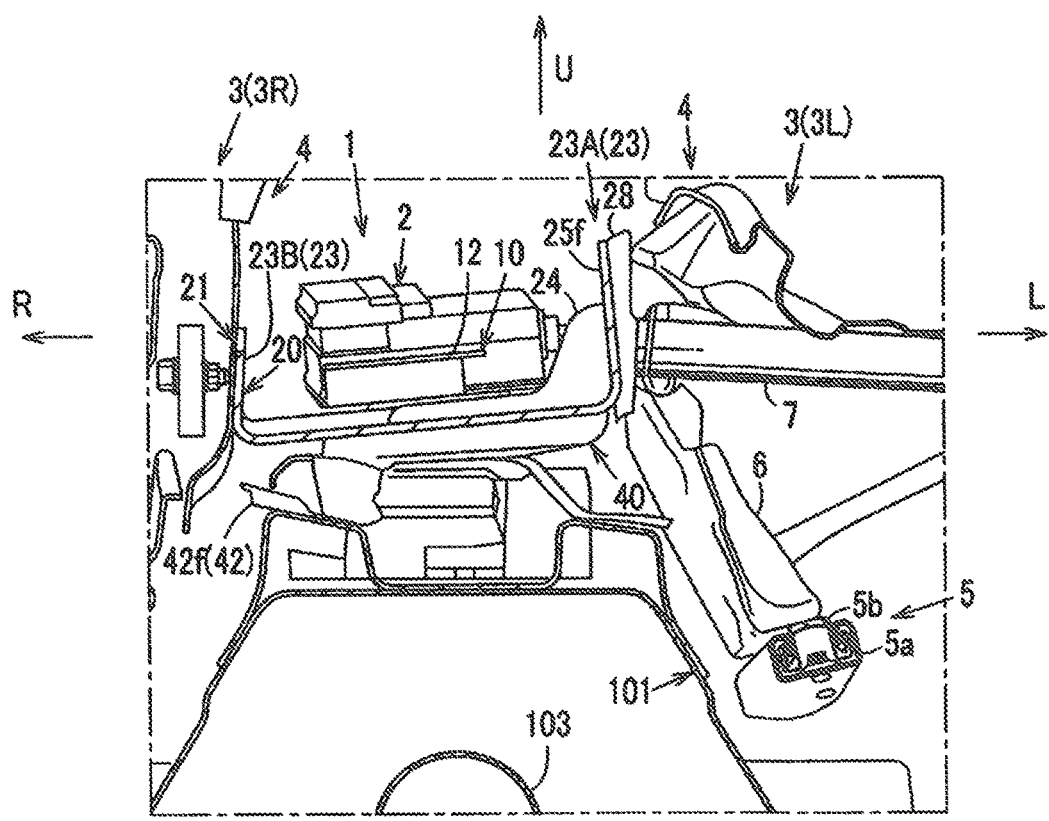
FIG. 13 is an operation explanatory diagram illustrating the arrangement structure of the vehicular auxiliary machine in a middle stage of side collision.
Figure 14:
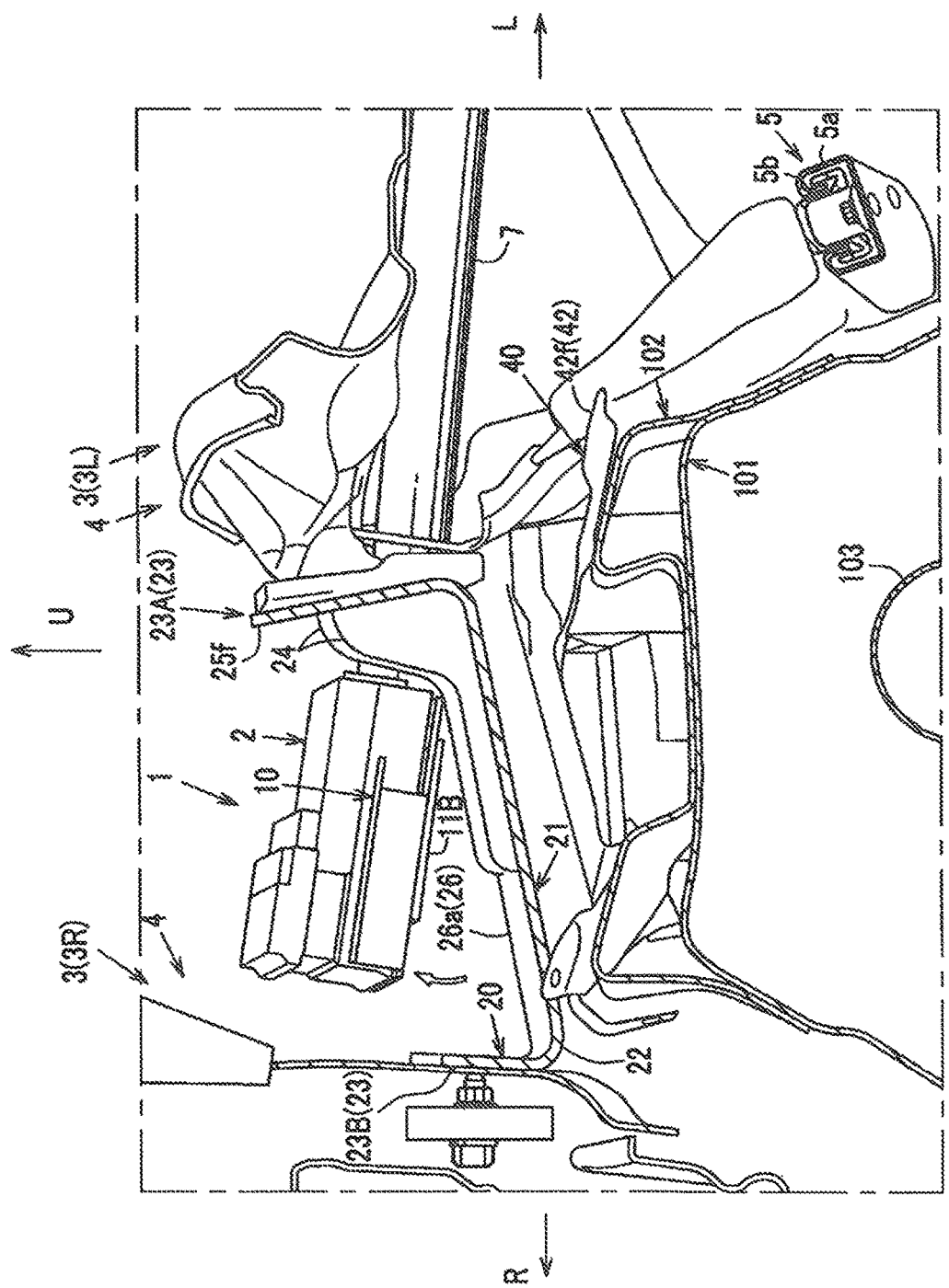
FIG. 14 is an operation explanatory diagram illustrating the arrangement structure of the vehicular auxiliary machine in a last stage of side collision.

Next, in the following, operations of the DCM unit 1 of the present embodiment in three stages, namely, an initial stage, a middle stage, and a last stage when a side collision occurs from a vehicle left side (when a side collision occurs) where the harness connecting portion 29 is located with respect to the DCM 2 in the vehicular width direction are described with reference to FIGS. 12 to 14. FIG. 12 is an operation explanatory diagram illustrating a state of an initial stage of side collision, which is associated with FIG. 2. FIG. 13 is an operation explanatory diagram illustrating a state of a middle stage of side collision, which is associated with FIG. 2. FIG. 14 is an operation explanatory diagram illustrating a state of a last stage of side collision, which is associated with FIG. 2.

First, in an initial stage of side collision, accompanied by an input of load from a vehicle left side, as illustrated in FIG. 12, the seat support structure 4 of the passenger's seat 3L is displaced from a state illustrated in FIG. 2 inwardly in the vehicular width direction, specifically, toward the DCM unit 1 by disengagement of the seat rail 5a from the floor panel 100, deformation of the seat support structure 4 itself, or the like.

As illustrated in FIG. 13, in a middle stage of side collision, particularly, an inner end of the bar-shaped seat cushion frame 7 in the vehicular width direction of the seat support structure 4 of the passenger's seat 3L, which is displaced inwardly in the vehicular width direction, is directly abutted against the harness-side vertical wall portion 23A.

The harness-side vertical wall portion 23A is received by the ribs 24 in such a way that the harness-side vertical wall portion 23A is not inclined toward the DCM 2, and the harness-side vertical wall portion 23A (protection plate 28) is reinforced by the front-rear-direction bead 34a in such a way that the harness-side vertical wall portion 23A itself is not deformed (see FIG. 6). Therefore, it is possible to securely receive a side collision load from the seat support structure 4 of the passenger's seat 3L.

Thus, as illustrated in FIG. 13, even when the non-harness-side vertical wall portion 23B is abutted against the seat support structure 4 of the driver's seat 3R, or when the DCM bracket pedestal member 40 is greatly deformed, it is possible to prevent an installation space of the DCM 2, which is defined by the protection bracket 20, specifically, by the base surface 22 and the paired vertical wall portions 23A and 23B, from being collapsed, whereby it is possible to prevent that the DCM 2 directly receives a side collision load from the seat support structure 4 of the passenger's seat 3L.

As illustrated in FIG. 14, in a last stage of side collision, when a load transmitted from the vehicle body (e.g. the DCM bracket pedestal member 40) to the DCM fixing bracket 10 via the protection bracket 20 increases to some extent, the DCM fixing bracket 10 is detached from the protection bracket 20 at a welded portion A (see FIG. 2) between the pedestal portion 26 of the protection bracket body 21 and the setting portion 11B of the DCM fixing bracket 10, whereby it is possible to displace the DCM fixing bracket 10 in such a way that the DCM fixing bracket 10 is lifted upwardly together with the DCM 2 (see the bold arrow in FIG. 14).

As described above, the DCM unit 1 of the present embodiment is an arrangement structure of a vehicular auxiliary machine in which the DCM 2 as a vehicular auxiliary machine is disposed between the front seats 3R and 3L arranged side by side in a vehicular width direction of a vehicle body. The DCM unit 1 includes the DCM bracket 500 on which the DCM 2 is mounted, and which is fixed to the vehicle body. The DCM 2 includes the harness connecting portion 29 to which the harness 61 is connected, and is disposed in such a way that the harness connecting portion 29 is located on a side of the front seat 3L (passenger's seat 3L). The protection bracket 20 of the DCM bracket 500 includes: the base surface 22, the paired vertical wall portions 23 (23A and 23B) which stand upright with respect to the base surface 22 in such a way as to be away from each other in the vehicular width direction, between the DCM 2 and each of the front seats 3 (3R, 3L); and the ribs 24 spanning between the harness-side vertical wall portion 23A being one of the paired vertical wall portions 23A and 23B close to the harness connecting portion 29 of the DCM 2, and the base surface 22 (see FIGS. 2 to 7, and 9).

In the present embodiment, the above configuration is able to reduce a possibility that the DCM 2 directly interferes with the passengers seat 3L when a side collision occurs. Specifically, when a side collision occurs, since the harness-side vertical wall portion 23A is supported by the ribs 24 in such a way that the harness-side vertical wall portion 23A is not inclined toward the DCM 2, it is possible to more securely protect the harness connecting portion 29, as compared with a case where the harness-side vertical wall portion 23A is not supported by the ribs 24. Therefore, it is possible to function the DCM 2, even when a part of the passenger's seat 3L (e.g. the seat cushion frame 7) is abutted against the harness-side vertical wall portion 23A when a side collision occurs.

In the present embodiment, the rib 24 is formed by the surface 24s parallel to the vehicular width direction (see FIGS. 2 to 4, 6, and 9).

In the present embodiment, the above configuration is able to more securely prevent that the harness-side vertical wall portion 23A is inclined by the rib 24 formed by the surface 24s parallel to the vehicular width direction, even when a part of the passengers seat 3L is abutted against the harness-side vertical wall portion 23A when a side collision occurs.

Further, in the present embodiment, the harness-side vertical wall portion 23A is formed by the protection plate 28, which is a member independent of the DCM fixing bracket 10 and the protection bracket body 21, and is detachably attached to the protection bracket body 21 (see FIGS. 3 to 6).

In the present embodiment, the above configuration is able to release the harness connecting portion 29 without being covered by the protection plate 28 from a left side by detaching the protection plate 28 from the protection bracket body 21. Therefore, it is possible to appropriately and easily connect the harness 61 to the DCM 2 without being obstructed by the protection plate 28, when the harness 61 is connected to the DCM 2. Further, by mounting the protection plate 28 on the protection bracket body 21 when the vehicle is traveling (ordinary state), it is possible to protect the harness connecting portion 29 against contact with the protection plate 28, even when a part of the passenger's seat 3L is displaced toward the DCM 2 when a side collision occurs.

Further, in the present embodiment, the front-rear-direction bead 34a as a reinforcing portion extending along the vehicular front-rear direction is formed on the harness-side vertical wall portion 23A (see FIGS. 4 and 6).

In the present embodiment, the above configuration is able to increase strength of the harness-side vertical wall portion 23A against contact with a part of the passenger's seat 3L when a side collision occurs by forming the front-rear-direction bead 34a as a reinforcing portion on the harness-side vertical wall portion 23A, and is able to enhance protection performance of the harness connecting portion 29 by the harness-side vertical wall portion 23A.

Further, in the present embodiment, the pedestal portion 26 bulging with respect to the base surface 22 is formed on the base surface 22. The step portion 27 (27f and 27r) extending in the vehicular width direction is formed on an end of the pedestal portion 26 (see FIGS. 3, and 5 to 9).

In the present embodiment, the above configuration is able to increase compression strength of the base surface 22 in the vehicular width direction by the pedestal portion 26 including the step portion 27 each extending in the vehicular width direction on an end thereof. Therefore, it is possible to retain a shape of the base surface 22 in such a way as to prevent a clearance between the vertical wall portions 23 from being narrowed by crush of the base surface 22 in the vehicle width direction when a side collision occurs.

Specifically, the present embodiment, reinforcing the harness-side vertical wall portion 23A by forming the ribs 24 also prevents relative weakening of the base surface 22, and it is also possible to reinforce the base surface 22 by the step portions 27. Therefore, it is possible to protect the DCM 2 by the vertical wall portion 23 and the base surface 22 when a side collision occurs.

The present disclosure is not limited to a configuration according to the embodiment, and various variations may be applied.

For example, the harness connecting portion 29 may be provided on a right side (driver's seat 3R side). Specifically, the harness-side vertical wall portion 23A and the non-harness-side vertical wall portion 23B may be disposed in such a way that left and right sides are reversed.

Further, an arrangement structure of a vehicular auxiliary machine of the present disclosure is not limited to a structure in which a vehicular auxiliary machine is disposed between front seats arranged side by side in a vehicular width direction. For example, the present disclosure may be applied to a structure in which a vehicular auxiliary machine is disposed between rear seats arranged side by side in a vehicular width direction.

[Overview of Present Disclosure]

An arrangement structure of a vehicular auxiliary machine according to an aspect of the present disclosure includes: the vehicular auxiliary machine disposed between seats arranged side by side in a vehicular width direction of a vehicle body; a bracket on which the vehicular auxiliary machine is mounted, and which is fixed to the vehicle body; and a harness to be connected to the vehicular auxiliary machine. The vehicular auxiliary machine includes a harness connecting portion to which the harness is connected, and is disposed in such a way that the harness connecting portion is located on a side of one of the seats. The bracket includes a base surface, a pair of vertical wall portions which stand upright with respect to the base surface in such a way that the vertical wall portions are away from each other in the vehicular width direction between the vehicular auxiliary machine and each of the seats, and a rib spanning between a harness-side vertical wall portion and the base surface, the harness-side vertical wall portion being one of the paired vertical wall portions close to the harness connecting portion of the vehicular auxiliary machine.

In the above aspect, it is possible to reduce a possibility that the vehicular auxiliary machine directly interferes with a seat when a side collision occurs. Specifically, it is possible to securely protect the vehicular auxiliary machine when collision occurs on a side surface (when a side collision occurs). In particular, since the harness connecting portion is more securely protected by the harness-side vertical wall portion and the rib on a side of the harness connecting portion, it is possible to function the vehicular auxiliary machine even when a seat is abutted against the harness-side vertical wall portion when a side collision occurs.

The arrangement structure of the vehicular auxiliary machine according to another aspect of the present disclosure is such that, in the above aspect, the rib is constituted by a surface parallel to the vehicular width direction.

In the above aspect, it is possible to more securely prevent the harness-side vertical wall portion from being inclined due to contact of a seat against the harness-side vertical wall portion when a side collision occurs.

The arrangement structure of the vehicular auxiliary machine according to another aspect of the present disclosure is such that, in the above aspect, the harness-side vertical wall portion includes a protection plate provided independently of the bracket, and detachably attached to the bracket.

In the above aspect, it is possible to expose the harness connecting portion without being covered by the protection plate by detaching the protection plate from the bracket. Therefore, it is possible to appropriately and easily connect a harness without being obstructed by the protection plate, when the harness is connected to the vehicular auxiliary machine.

The arrangement structure of the vehicular auxiliary machine according to another aspect of the present disclosure is such that, in the above aspect, the harness-side vertical wall portion includes a reinforcing portion formed in such a way as to extend along a vehicular front-rear direction.

In the above aspect, it is possible to increase strength of the harness-side vertical wall portion against contact of a seat when a side collision occurs by forming the reinforcing portion on the harness-side vertical wall portion, and it is possible to enhance protection performance of the harness connecting portion by the harness-side vertical wall portion.

In the above aspect, the reinforcing portion may be formed by a step portion (ridge portion) extending along a vehicular front-rear direction, a concave or convex bead, a rib (thickened portion), or a member formed by combining at least one of these elements, for example.

The arrangement structure of the vehicular auxiliary machine according to another aspect of the present disclosure is such that, in the above aspect, the base surface includes a pedestal portion formed in such a way as to bulge with respect to the base surface, and the pedestal portion includes a step portion formed on an end of the pedestal portion in such a way as to extend in the vehicular width direction.

In the above aspect, since the step portion formed on an end of the pedestal portion in such a way as to extend in the vehicular width direction enables to increase strength of the base surface in the vehicular width direction, it is possible to retain a shape of the base surface in such a way as to prevent a clearance between the vertical wall portions from being narrowed by crush of the base surface in the vehicle width direction when a side collision occurs. Thus, it is possible to protect the vehicular auxiliary machine from damage.

Specifically, there is no likelihood that the base surface is relatively weakened by reinforcing the base surface by the step portion, in addition to reinforcing the harness-side vertical wall by forming the rib. Therefore, it is possible to protect the vehicular auxiliary machine by the vertical wall portion and the base surface when a side collision occurs.

An arrangement structure of a vehicular auxiliary machine according to an aspect of the present disclosure includes: the vehicular auxiliary machine disposed between seats arranged side by side in a vehicular width direction of a vehicle body:, and a bracket on which the vehicular auxiliary machine is mounted, and which is fixed to the vehicle body. The bracket includes an auxiliary machine fixing bracket to which the vehicular auxiliary machine is fixed, and a protection bracket having a vertical wall portion between a seat and the vehicular auxiliary machine. The auxiliary machine fixing bracket is configured to be displaceable relative to the protection bracket, when the protection bracket is deformed by contact against the seat, In the above aspect, even when the protection bracket is deformed by contact of the seat against the bracket when collision occurs on a side surface (when a side collision occurs), the auxiliary machine fixing bracket is displaceable relative to the protection bracket. Therefore, it is possible to prevent damage of the vehicular auxiliary machine itself accompanied by deformation of the protection bracket.

The arrangement structure of the vehicular auxiliary machine according to another aspect of the present disclosure is such that, in the above aspect, the auxiliary machine fixing bracket is fixed only via the protection bracket with respect to the vehicle body in such a way that a side collision load is not transmitted from the vehicle body.

In the above aspect, the auxiliary machine fixing bracket is fixed only via the protection bracket with respect to the vehicle body in such a way that a side collision load is not transmitted from the vehicle body. Therefore, there is no likelihood that a side collision load is transmitted from the vehicle body to the auxiliary machine fixing bracket directly due to displacement of the auxiliary machine fixing bracket relative to the protection bracket when a side collision occurs. Thus, it is possible to prevent damage of the vehicular auxiliary machine itself against a side collision load.

The arrangement structure of the vehicular auxiliary machine according to another aspect of the present disclosure is such that, in the above aspect, the auxiliary machine fixing bracket is detachably fixed to the protection bracket by welding.

In the above aspect, it is possible to displace the auxiliary machine fixing bracket relative to the protection bracket without fixation by detaching the auxiliary machine fixing bracket from the protection bracket by using an impact due to contact of a seat against the bracket when a side collision occurs. Therefore, it is possible to prevent damage of the vehicular auxiliary machine itself without applying an excessive impact by side collision to the auxiliary machine fixing bracket.

In the arrangement structure of the vehicular auxiliary machine according to each of the aspects, it is possible to reduce a possibility that the vehicular auxiliary machine directly interferes with a seat when a side collision occurs.

The invention claimed is:

1. An arrangement structure of a vehicular auxiliary machine, comprising:
   the vehicular auxiliary machine disposed between seats arranged side by side in a vehicular width direction of a vehicle body;
   a bracket on which the vehicular auxiliary machine is mounted, and which is fixed to the vehicle body; and
   a harness to be connected to the vehicular auxiliary machine, wherein
   the vehicular auxiliary machine includes a harness connecting portion to which the harness is connected, and is disposed in such a way that the harness connecting portion is located on a side of one of the seats, and
   the bracket includes
   a base surface,
   a pair of vertical wall portions which stand upright with respect to the base surface in such a way that the vertical wall portions are away from each other in the vehicular width direction between the vehicular auxiliary machine and each of the seats, and
   a rib spanning between a harness-side vertical wall portion and the base surface, the harness-side vertical wall portion being one of the paired vertical wall portions close to the harness connecting portion of the vehicular auxiliary machine, and
   the harness-side vertical wall portion includes a protection plate provided independently of the bracket, and detachably attached to the bracket.

2. The arrangement structure of the vehicular auxiliary machine according to claim 1, wherein
   the rib is constituted by a surface parallel to the vehicular width direction.

3. The arrangement structure of the vehicular auxiliary machine according to claim 2, wherein
   the harness-side vertical wall portion includes a reinforcing portion formed in such a way as to extend along a vehicular front-rear direction.

4. The arrangement structure of the vehicular auxiliary machine according to claim 3, wherein
   the base surface includes a pedestal portion formed in such a way as to bulge with respect to the base surface, and
   the pedestal portion includes a step portion formed on an end of the pedestal portion in such a way as to extend in the vehicular width direction.

5. The arrangement structure of the vehicular auxiliary machine according to claim 2, wherein
   the base surface includes a pedestal portion formed in such a way as to bulge with respect to the base surface, and
   the pedestal portion includes a step portion formed on an end of the pedestal portion in such a way as to extend in the vehicular width direction.

6. An arrangement structure of a vehicular auxiliary machine comprising:
   the vehicular auxiliary machine disposed between seats arranged side by side in a vehicular width direction of a vehicle body;
   a bracket on which the vehicular auxiliary machine is mounted, and which is fixed to the vehicle body; and
   a harness to be connected to the vehicular auxiliary machine, wherein
   the vehicular auxiliary machine includes a harness connecting portion to which the harness is connected, and is disposed in such a way that the harness connecting portion is located on a side of one of the seats, and
   the bracket includes
   a base surface,
   a pair of vertical wall portions which stand upright with respect to the base surface in such a way that the vertical wall portions are away from each other in the vehicular width direction between the vehicular auxiliary machine and each of the seats, and
   a rib spanning between a harness-side vertical wall portion and the base surface, the harness-side vertical wall portion being one of the paired vertical wall portions close to the harness connecting portion of the vehicular auxiliary machine, and
   the base surface includes a pedestal portion formed in such a way as to bulge with respect to the base surface, and
   the pedestal portion includes a step portion formed on an end of the pedestal portion in such a way as to extend in the vehicular width direction.

7. The arrangement structure of the vehicular auxiliary machine according to 1, wherein
   the harness-side vertical wall portion includes a reinforcing portion formed in such a way as to extend along a vehicular front-rear direction.

8. The arrangement structure of the vehicular auxiliary machine according to claim 7, wherein
   the base surface includes a pedestal portion formed in such a way as to bulge with respect to the base surface, and
   the pedestal portion includes a step portion formed on an end of the pedestal portion in such a way as to extend in the vehicular width direction.

9. An arrangement structure of a vehicular auxiliary machine, comprising:
   the vehicular auxiliary machine disposed between seats arranged side by side in a vehicular width direction of a vehicle body; and
   a bracket on which the vehicular auxiliary machine is mounted, and which is fixed to the vehicle body, wherein
   the bracket includes an auxiliary machine fixing bracket to which the vehicular auxiliary machine is fixed, and a protection bracket including a vertical wall portion between a seat and the vehicular auxiliary machine, and
   the auxiliary machine fixing bracket is configured to be displaceable relative to the protection bracket, when the protection bracket is deformed by contact against the seat.

10. The arrangement structure of the vehicular auxiliary machine according to claim 9, wherein
the auxiliary machine fixing bracket is fixed only via the protection bracket with respect to the vehicle body in such a way that a side collision load is not transmitted from a side of the vehicle body.

11. The arrangement structure of the vehicular auxiliary machine according to claim 10, wherein
the auxiliary machine fixing bracket is detachably fixed to the protection bracket by welding.

* * * * *